United States Patent [19]
Lardy et al.

[11] Patent Number: 5,642,644
[45] Date of Patent: Jul. 1, 1997

[54] CONTROL SYSTEM AND CONTROL PROCESS FOR AN INFINITELY VARIABLE TRANSMISSION

[75] Inventors: Patric Lardy, Weil der Stadt; Joseph Petersmann, Wimsheim, both of Germany

[73] Assignee: Dr. Ing. h.c.F. Porsche AG, Germany

[21] Appl. No.: 561,311

[22] Filed: Nov. 21, 1995

[30] Foreign Application Priority Data

Nov. 24, 1994 [DE] Germany ............... 44 41 875.2

[51] Int. Cl.⁶ ............... F16H 59/06; B60K 41/16
[52] U.S. Cl. ............... 74/335; 74/336 B; 477/46; 477/48; 477/162
[58] Field of Search ............... 74/335, 336 B; 477/45, 46, 48, 162

[56] References Cited

U.S. PATENT DOCUMENTS

| | | | |
|---|---|---|---|
| 4,669,336 | 6/1987 | Okada et al. | 477/45 X |
| 4,862,771 | 9/1989 | Kumura et al. | 477/48 X |
| 5,070,740 | 12/1991 | Giek et al. | 74/335 X |

FOREIGN PATENT DOCUMENTS

| | | | |
|---|---|---|---|
| 61-115735 | 6/1986 | Japan | 477/46 |
| 94/24463 | 10/1994 | WIPO | 74/335 |

Primary Examiner—Richard M. Lorence
Assistant Examiner—Nathan O. Jensen
Attorney, Agent, or Firm—Evenson, McKeown, Edwards & Lenahan P.L.L.C.

[57] ABSTRACT

A control system and process for an infinitely variable transmission which has a first operating mode which automatically selects the transmission ratio, and a second operating mode in which the transmission ratio can be selected directly by the driver. According to the invention, the degree of damping effective during the adjustment of the transmission ratio is adjusted in response to the selected operating mode. In the automatic operating mode, a high degree of damping is used, while in the manual operating mode, a lower degree of damping is provided.

10 Claims, 4 Drawing Sheets

CONTROL SYSTEM AND CONTROL PROCESS FOR AN INFINITELY VARIABLE TRANSMISSION

BACKGROUND AND SUMMARY OF THE INVENTION

This invention relates to a method and apparatus for controlling an infinitely variable transmission in which the transmission ratio is selected automatically in a first operating mode, and can be selected by the vehicle operator in a second operating mode. German Patent Document DE 41 20 540 C1, for example, discloses an infinitely variable transmission which simulates a stepped transmission, and which can be influenced directly by the driver.

In general, the transmission ratio adjustment (more precisely, the adjustment of the line pressure) in an infinitely variable transmission is designed for automatically implemented, steady and slower adjusting operations. In order to carry out these adjusting operations in a material-saving manner and without disturbing vibrations, the adjustment of the transmission ratio is provided with a high degree of damping, either in the transmission ratio control system, which carries out the determination of the transmission ratio to be adjusted, or in an adjusting device which adjusts a preset transmission ratio by changing the pressures acting upon adjusting elements of the transmission.

In simulating a stepped transmission, such as disclosed in DE 41 20 540 C1 referred to above, transmission ratio changes must be carried out within as short a time period as possible, and after a transmission ratio change, the transmission ratio is then kept essentially constant. However, this is not possible with the described high degree of damping because, as a result of the damping, fast changes of the transmission ratio are prevented.

The object of the present invention is to provide a control system for a vehicle transmission which alleviates the latter deficiency, by providing a degree of damping during adjustment of the transmission ratio, which is adapted to the selected operating mode: In the automatic operating mode, a high degree of damping is used, and therefore a high degree of comfort is achieved as well as low wear and low energy expenditures for adjusting the transmission ratio. In the manual operating mode, on the other hand, a low degree of damping is provided in order to simulate as precisely as possible the shifting represented by transmission ratio jumps.

According to one embodiment of the invention, the arrangement of the damping devices in an adjusting device is implemented in a particularly simple manner by making the adjusting device separate from the actual transmission ratio control. In addition, the adjusting device directly takes into account all hydraulic influencing variables which affect the adjustment of the transmission ratio on the transmission, so that it may be sufficient at this point if the degree of damping existing devices or functions can be controlled.

Arrangement of the damping device in a transmission ratio control system, which determines a desired transmission ratio, has the advantage that the degree of damping has a targeted effect only when the desired transmission ratio is given. It is a prerequisite that the adjusting device which follows has a degree of damping which is smaller than the smallest degree of damping used within the damping device.

In another embodiment, two damping devices, each with a fixed degree of damping, are arranged directly at the output of devices for determining the desired transmission ratio in the first and the second operating mode. This embodiment is simpler than the above-mentioned arrangements because, as a result of the direct assignment to the operating modes, a switching device for the degree of damping is not required.

Other objects, advantages and novel features of the present invention will become apparent from the following detailed description of the invention when considered in conjunction with the accompanying drawings.

DETAILED DESCRIPTION OF THE DRAWINGS

Figure 1:
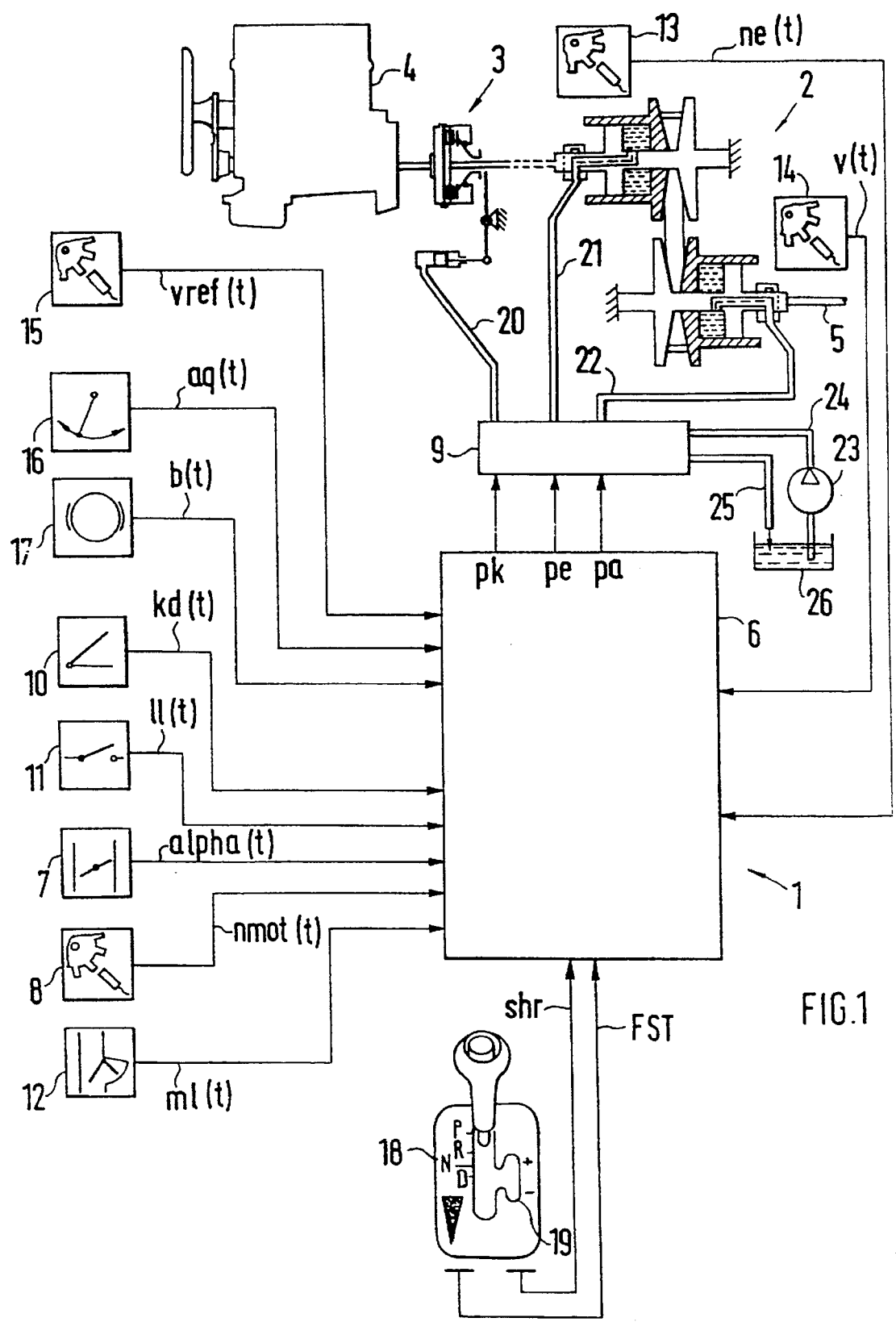
FIG. 1 is a schematic block diagram which shows an overview of an infinitely variable transmission with a control system according to the invention.

FIG. 1 is a block diagram of a control 1 of an electrohydraulically operated infinitely variable transmission 2 based, for example, on a wind around transmission. The infinitely variable transmission 2 is driven by an internal-combustion engine 4 by way of a controllable starting clutch 3. An output shaft 5 of the infinitely variable transmission 2 is connected with a drive wheel of a motor vehicle (not shown).

Variables or functions which change with time t are illustrated in the following as functions f(t) of time t (for example, alpha(t) in FIG. 1).

A control unit 6 controls a hydraulic valve block 9 as a function of at least the throttle valve position alpha(t) of a throttle valve angle generator 7 and a rotational engine speed nmot(t) of a rotational engine speed generator 8 of the internal-combustion engine 4. To control the infinitely variable transmission 2 and the starting clutch 3, the control unit 6 receives, as additional input variables, a kick-down signal kd(t) of a kick-down switch 10, an idling signal 11(t) of an idling switch 11, an air quantity or air mass ml(t) of an air quantity or air mass generator 12 of the internal-combustion engine 4, as well as a transmission rotational input speed ne(t) of a transmission rotational input speed generator 13 and a driving speed v(t) of a driving speed generator 14. In addition, the control unit 6 detects and processes a speed vref(t) of a reference speed generator 15 on a nonpowered vehicle axle, a lateral acceleration aq(t) of a lateral acceleration generator 16 and a brake signal b(t) of a brake signal generator 17.

Finally, the control can normally be influenced by the vehicle driver by way of a selecting device 18 for preselecting the driving positions P (parking position), R (reverse gear position), N (idling gear position) and D (automatic adjusting of the transmission ratio of the infinitely variable transmission). In addition, an adjusting range of the selecting device 18 is provided for directly defining the transmission ratio etc.

The selecting device 18 can be moved from driving position D into a second shifting channel 19 in which it operates as a rocker switch, and the vehicle driver can influence the transmission ratio in the sense of an upshifting or downshifting. The selecting device 18 emits a driving position signal FST and a shifting requirement signal shr for an upshifting or a downshifting.

Here and in the following, the term "upshifting" or "reducing the transmission ratio" indicates a transmission ratio change which, for a given the rotational input speed increases the rotational output speed of the transmission, corresponding to an upshifting in the case of a stepped transmission. Inversely, the terms "downshifting" and "increasing the transmission ratio" indicate a transmission ratio change in the sense of a reduction of the rotational output speed of the transmission while the rotational input speed remains the same, corresponding to a downshifting in the case of a stepped transmission.

As a function of the mentioned variables, the control unit 6 controls the hydraulic pressure in the starting clutch 3 in a conventional manner by way of a signal output pk and the valve block 9 as well as a transmission ratio ue between the transmission rotational input speed ne(t) and the transmission rotational output speed (driving speed) v(t) by way of signal outputs pe and pa and the hydraulic valve block 9. For this purpose, the hydraulic valve block 9 connects corresponding control lines 20, 21 and 22 of the starting clutch 3 and of the infinitely variable transmission 2 with a pressure line 24 connected to a pump 23 or with a return flow line 25 to a storage tank 26 for the hydraulic fluid.

Figure 2:
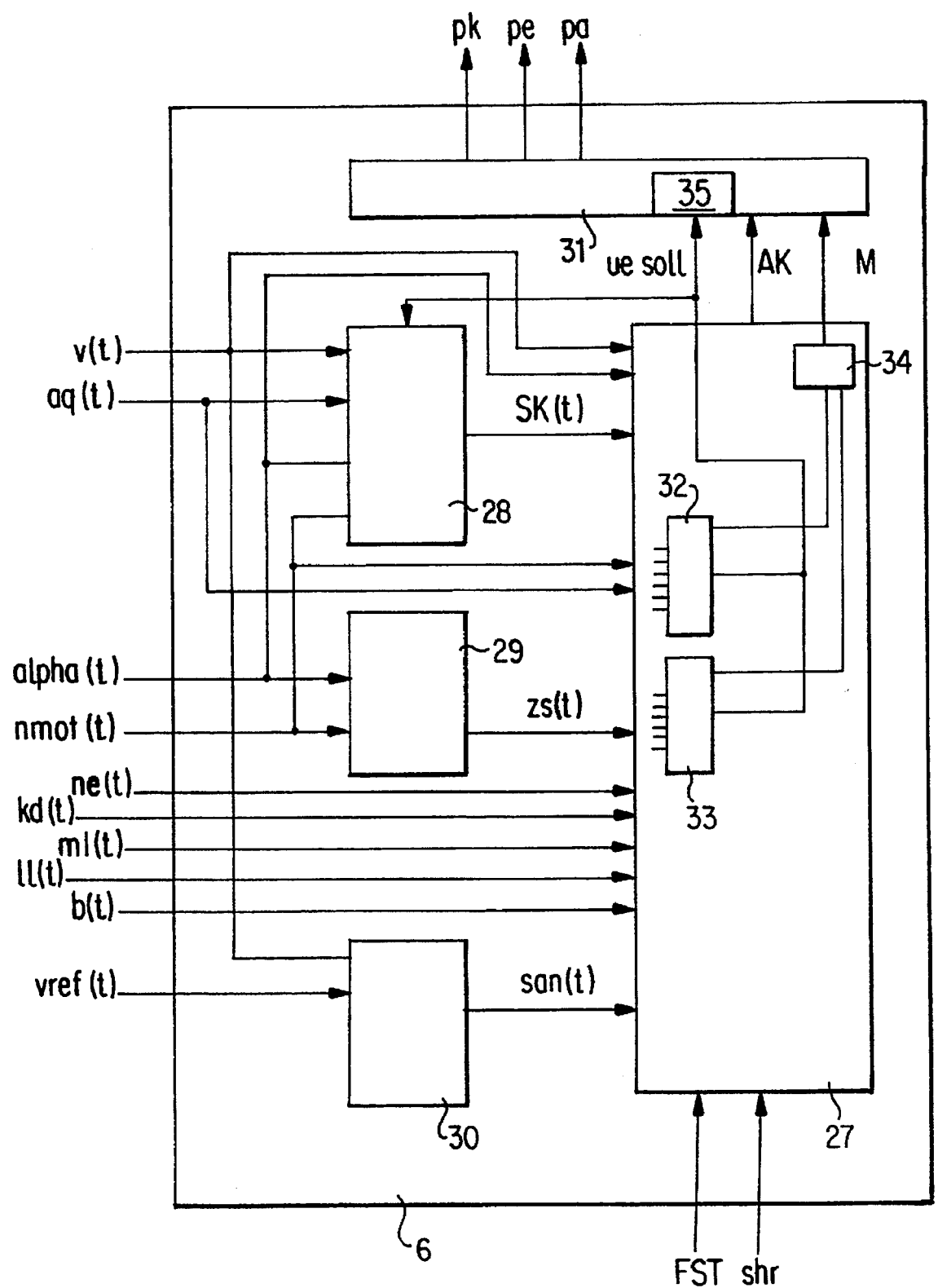
FIG. 2 is a schematic block diagram of a first embodiment of a transmission ratio control.

As illustrated in FIG. 2, the control unit 6 comprises a transmission ratio control system 27 which is connected with a driving activity determining function 28, a drive/coasting determining function 29, a wheel slip determining function 30 and an adjusting function 31.

The driving activity determining function 28 determines a driving activity variable SK(t) which evaluates the driver's driving style or his traffic-situation-dependent action with respect to the control of the motor vehicle in a known manner, and preferably according to a process described in German Patent Document DE-OS 39 22 051.

Depending on the throttle valve position alpha(t) and the rotational engine speed nmot(t), the drive/coasting determining function 29 emits a signal indicative of drive or coasting operation of the vehicle zs(t), and the wheel slip determining function 30 determines a wheel slip san(t), representing the slip of the driven wheels, from the difference of the driving speed v(t) and the speed vref(t).

From these variables, as well as the driving position signal FST, the shifting requirement signal shr, the throttle valve position alpha (t), the kick-down signal kd(t), the idling signal 11(t), the air mass ml(t), the transmission rotational input speed ne(t), the driving speed v(t), the lateral acceleration aq(t), the braking signal b(t) and the transmission rotational output speed ne(t), the transmission ratio control system 27 determines a desired transmission ratio $ue_{des}$ as well as a driving clutch open/shut AK signal which are transmitted to the adjusting function 31.

By means of the signal outputs pe and pa, the adjusting function 31 controls adjustment of the transmission ratio of the transmission 2. In addition, the starting clutch is controlled according to the starting clutch open/shut AK signal by the adjusting function 31 by way of the signal output pk. In the adjusting function 31, the desired transmission ratio $ue_{des}$ is not implemented directly but only after passing through a front-connected damping function 35.

In a first method of operation, which automatically selects the transmission ratio, the transmission ratio control system 27 automatically determines the desired transmission ratio $ue_{des}$ by means of a determining function 32 from the input variables drive/coasting zs(t), wheel slip san(t), driving position signal FST, driving activity SK(t), throttle valve position alpha(t), rotational engine speed nmot(t), idling signal 11(t), kick-down signal kd(t), air mass signal ml(t), braking signal b(t) and transmission rotational input speed ne(t).

In a second method of operation, a stepped transmission which can be influenced directly by the driver is simulated by means of a second determining function 33. In this mode, the desired transmission ratio $ue_{des}$ is determined from the shifting requirement signal shr, transmission rotational input speed ne(t), throttle valve position alpha(t) and drive/coasting zs(t).

The second determining function 33 contains a table (not shown) in which preset desired transmission ratios $ue_{des\_}i$ are stored. Since each of these preset desired transmission ratios $ue_{des\_}i$ corresponds to a gear of a simulated stepped transmission, as many preset desired transmission ratios $ue_{des\_}i$ are provided as there are gears of a stepped transmission that is to be simulated. The preset desired transmission ratios $ue_{des\_}i$ may therefore also be called gears.

In the illustrated example, a 5-gear stepped transmission is simulated so that, for forward driving, the preset desired transmission ratios $ue_{des\_}1$, $ue_{des\_}2$, $ue_{des\_}3$, $ue_{des\_}4$ and $ue_{des\_}5$ are stored in the table. The designation $ue_{des\_}i$ of the preset desired transmission ratios accords with the $ue_{des\_}i$ pattern, in which i indicates the corresponding gear of the stepped transmission, $ue_{des\_}3$ therefore indicates the preset desired transmission ratio which corresponds to the 3rd gear of the stepped transmission. (As noted previously, while the gears become "higher" from $ue_{des\_}1$ to $ue_{des\_}5$, the value of the preset desired transmission ratio is reduced in this direction: the preset desired transmission ratio is the highest at $ue_{des\_}1$ and the lowest at $ue_{des\_}5$.)

In each of the two operating modes, the transmission ratio control 27 transmits the desired transmission ratio $ue_{des}$ to the adjusting function 31. In addition, an operating mode generator 34 generates a signal O/M which indicates whether the first operating mode (O/M=A), which automatically selects the transmission ratio, or whether the second operating mode (O/M=M), which is influenced by the driver, is currently selected.

If the first operating mode is selected, the damping function 35 will provide for a high degree of damping when adjusting the transmission ratio of the transmission 2. The transmission ratio adjustment is therefore comfortable, and, as a result of the high degree of damping, not every change of the desired transmission ratio is immediately carried out. (That is, the smallest transient changes are effectively eliminated by the damping effect.) Thus, the energy expenditures required for adjusting the transmission ratios on the transmission 2 are reduced because of the reduced number of adjustments and the low speed at which these adjusting movements are carried out. In addition, wear on the transmission is reduced for the same reason.

If, however, the second operating mode is selected, the damping function 35 provides for a low degree of damping during the adjustment of the transmission ratio of the transmission 2, in which case the desired transmission ratio $ue_{des\_}i$ is adjusted with the shortest possible time delay, but without any noticeable overshooting.

Figure 3:
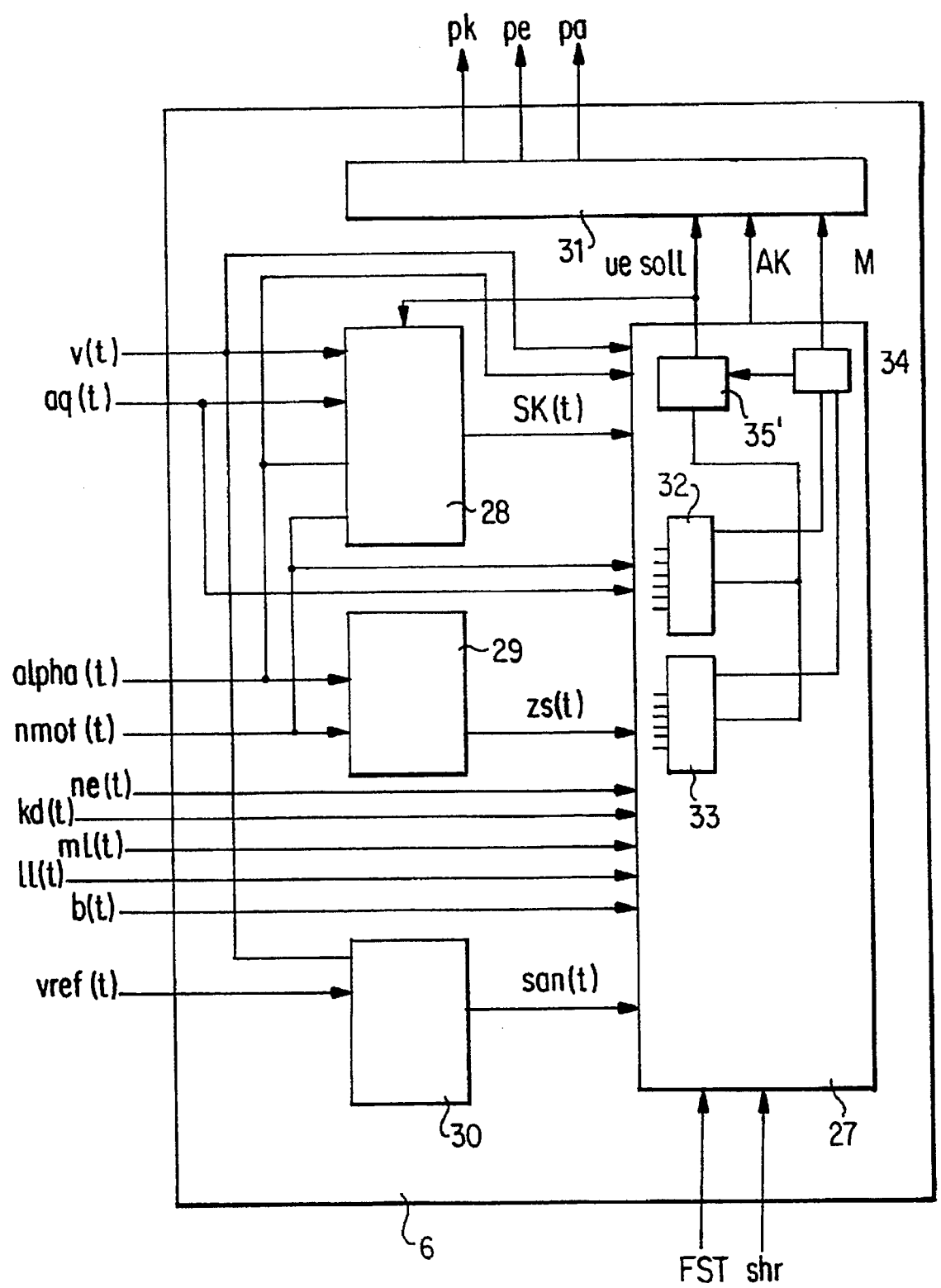
FIG. 3 is a schematic block diagram of a second embodiment of a transmission ratio control.

According to another embodiment illustrated in FIG. 3, the damping function 35' can be arranged in the transmission ratio control 27 instead of the adjusting function 31.

Figure 4:
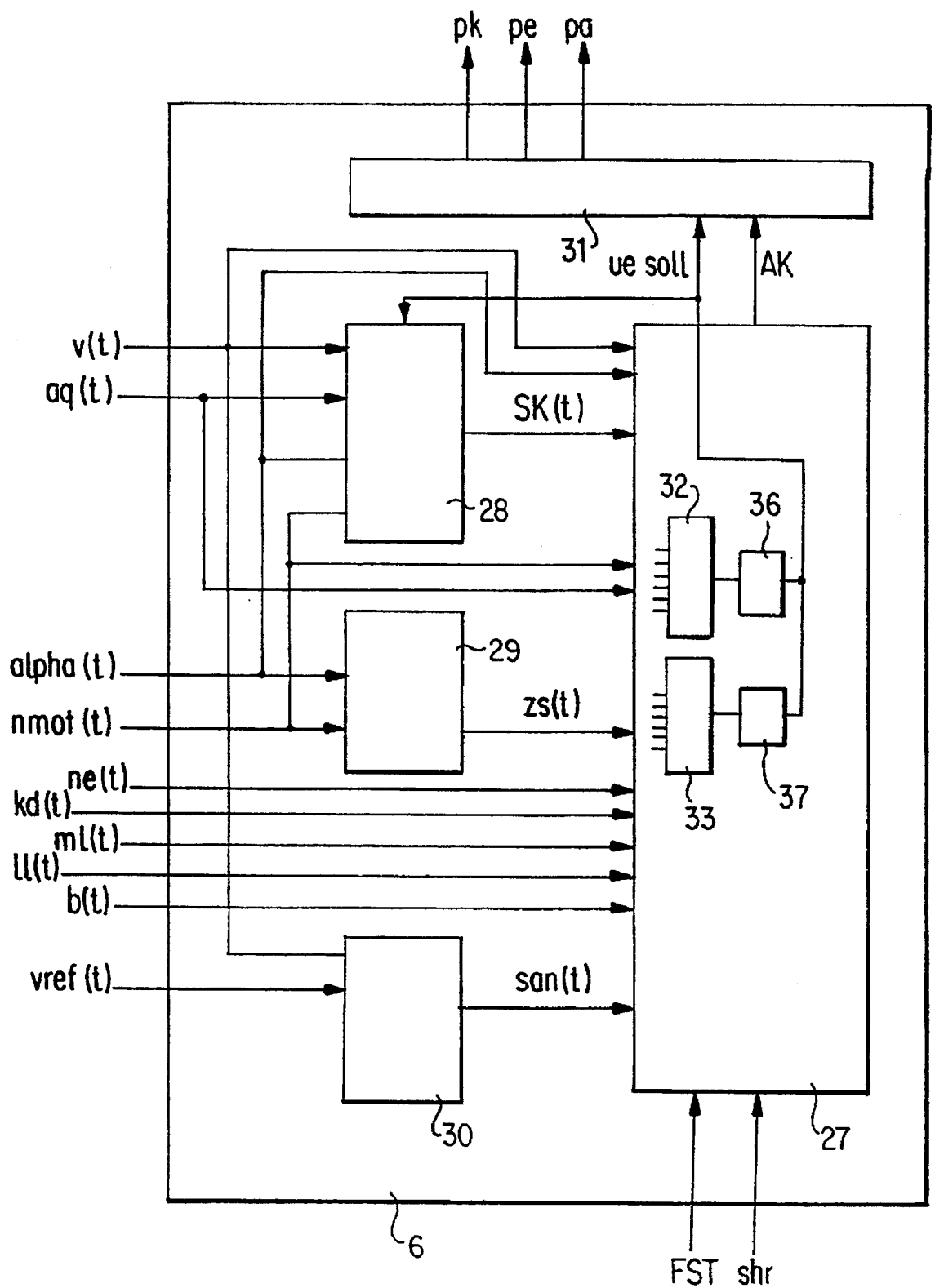
FIG. 4 is a schematic block diagram of a third embodiment of a transmission ratio control.

If it is possible to accommodate two damping functions, according to another embodiment shown in FIG. 4, the single damping function 35 is replaced by two separate damping functions 36, 37 which are provided with different degrees of damping, and are arranged at the outputs of the respective determining functions 32, 33. In this case, no operating mode generator 34 is required, and accordingly, a signal O/M is eliminated in this embodiment, as shown in FIG. 4. The damping function 36 assigned to the first determining function 32, in this case, has a higher degree of damping than the damping function 37 assigned to the second determining function 33.

The control system according to the invention may be implemented as either a system or a process. An example of an implementation as a system would be the representation in discrete structural components, whether it is an electric circuit or a hydraulic circuit. The implementation of the process may also be carried out in that the illustrated functions are programmed as subprograms in a microprocessor-operated control unit, and thus represent a sequence of process steps.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. In a control system for an infinitely variable transmission, of the type having a first operating mode, which automatically selects a transmission ratio, and a second operating mode in which a transmission ratio can be selected directly by a driver, an arrangement for damping shifting of said transmission between selected transmission ratios, said arrangement comprising:

first means operative when said transmission is in said first operating mode for providing damping of said shifting of said transmission at a first level; and second means operative when said transmission is in said second operating mode for providing damping of said shifting of said transmission at a second level;

wherein a degree of damping provided at said first level is greater than a degree of damping provided at said second level.

2. Arrangement according to claim 1, wherein said first and second means comprise a damping device which provides for damping at said first level when said first mode is operative and at said second level when said second mode is operative.

3. Arrangement according to claim 1, wherein said first and second damping means comprise first and second damping devices respectively, said first damping device generating damping at said first level in response to a gear selection in said first operating mode, and said second damping device generating damping at said second level in response to a gear selection in said second operating mode.

4. Arrangement according to claim 2, wherein the control system has a transmission ratio control unit, which determines a desired transmission ratio, and connected behind it, an adjusting device which adjusts a desired transmission ratio on the transmission, and the damping device is arranged within the adjusting device.

5. Arrangement according to claim 2, wherein the control system has a transmission ratio control unit, which determines a desired transmission ratio, and connected behind it, an adjusting device which adjusts a desired transmission ratio on the transmission, and the damping device is arranged within the transmission ratio control unit.

6. Arrangement according to claim 1, further comprising a transmission ratio control unit, which has a first determining device for determining a desired transmission ratio in the first operating mode, and a second determining device for determining a desired transmission ratio in the second operating mode, and said first and second damping means, each providing a fixed degree of damping, are arranged at outputs of the first and of the second determining devices, respectively.

7. In a process for controlling an infinitely variable transmission of the type having a first operating mode which automatically selects a transmission ratio, and a second operating mode in which a transmission ratio can be selected directly by the driver, process steps for damping shifting of said transmission between selected transmission ratios, said process steps comprising:

providing for damping of said shifting of said transmission at a first level, operative when said transmission is in said first operating mode; and providing for damping of said shifting of said transmission at a second level, operative when said transmission is in said second operating mode;

wherein a degree of damping provided at said first level is greater than a degree of damping provided at second level.

8. Process according to claim 7, further comprising the steps of:

determining a desired transmission ratio in a transmission ratio control function; and adjusting a desired transmission ratio on the transmission in an adjusting function;

wherein said damping is performed in the adjusting function.

9. Process according to claim 7, further comprising the steps of:

determining a desired transmission ratio in transmission ratio control function; and adjusting a desired transmission ratio on the transmission in an adjusting function;

wherein said damping is performed in the transmission ratio control function.

10. Process according to claim 7, comprising the further steps of:

determining a desired transmission ratio in the first operating mode; and determining a desired transmission ratio in the second operating mode;

wherein said first providing step comprises providing a fixed degree of damping at said first level in response to a result of said first determining step, and said second providing step comprises providing a fixed degree of damping at said second level in response to a result of said second damping step.

* * * * *